United States Patent Office 3,472,938
Patented Oct. 14, 1969

3,472,938
COMPOSITIONS AND METHODS EMPLOYING N(α-NAPHTHYL)AMINOALIPHATIC ACID AND LOWER ALKYL ESTERS THEREOF AS TRANQUILIZERS
Volkert Claassen, Weesp, Hendrikus Obias Huisman, Amstelveen, and Gerardus Henricus Maria Mos, Weesp, Netherlands, assignors, by mesne assignments, to U.S. Philips Corporation, New York, N.Y., a corporation of Delaware
No Drawing. Continuation-in-part of application Ser. No. 486,224, Sept. 9, 1965. This application Nov. 30, 1966, Ser. No. 597,892
Claims priority, application Netherlands, Nov. 30, 1965, 6515519
Int. Cl. A61k 27/00; C07c 101/44
U.S. Cl. 424—309          16 Claims

ABSTRACT OF THE DISCLOSURE

N(α-naphthyl) aminoaliphatic acids and lower esters thereof are disclosed. The naphthyl group may be substituted by halogen, alkyl or alkoxy radicals. Examples of the compounds are N(6-methoxy-α-naphthyl)-3-aminopropionic acid, N-(α-naphthyl)-2,2-dimethyl-3-aminopropionic acid and N-(6-methoxy-α-naphthyl)-3-methyl-3 aminopropionic ethylester. The compounds exhibit tranquilizer activities.

---

This application is a continuation-in-part of our copending application Ser. No. 486,224, filed Sept. 9, 1965, now abandoned.

The invention in this application relates to novel tranquilizer compositions, to novel compounds employed in said compositions and to a novel method of producing a tranquilizer effect in mammals.

A principal object of our invention is to provide an improved class of tranquilizer compounds. This and other objects of our invention will be apparent from the description that follows:

According to one aspect of our invention, we have prepared a novel group of α-naphthyl compounds selected from the group consisting of the base:

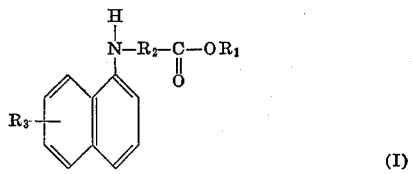

(I)

wherein $R_1$ is selected from the group consisting of hydrogen, alkyl of 1 to 4 carbon atoms and alkali metals, particularly Na and $KR_3$ is a member selected from the group consisting of alkyl of 1 to 4 carbon atoms, alkoxy of 1 to 4 carbon atoms and halogen and $R_2$ is an alkylene group of 2 to 7 carbon atoms with the exception of a alkylated methylene group and $R_3$ may be a hydrogen-atom in the case the alkylene group of $R_2$ has 3 to 7 carbon atoms and in the case $R_2$ is an ethylene group and $R_1$ is ethyl and the acid addition salts thereof, with pharmaceutically acceptable acids. We have found that these compounds exhibit strong tranquilizer activities with very few side effects when administered to mammals.

We have found those derivatives wherein $R_3$ particularly on the 6 position is alkoxy and $R_2$ is ethylene and also those derivatives wherein $R_2$ is alkylene of 3 to 7 carbon atoms inclusive of which at least three carbon atoms are in a straight chain connecting the amino nitrogen to the carboxylic carbon include some of the most effective compounds. The activity of the compounds of the invention was assessed among other ways by pharmacological tests in which the potentializing effect of the substances on the depressive effect of hexobarbital was determined in mice. There was particularly found a very strong oral activity.

The following table indicates for repesentative compounds of our invention corresponding to Formula I the $ED_{50}$ values found in tests in which 60 minutes prior to the injection of an almost narcotic intravenously administered dose of hexobarbital (30 mg./kg.) a dose of the substance to be tested was administered orally or intravenously. The $ED_{50}$ value was calculated from the results of four dosage groups:

TABLE

| $R_3$ | $R_2$ | $R_1$ | $ED_{50}$ Intra., mg./kg. | $ED_{50}$ Oral mg./kg. |
|---|---|---|---|---|
| H | $-\overset{\overset{\text{C}}{\mid}}{\text{C}}-\text{C}-$ | H | 12 | 15 |
| H | $-\text{C}-\overset{\overset{\text{C}}{\mid}}{\text{C}}$ | H | 25 | >75 |
| H | $-\overset{\overset{\text{C}-\text{C}}{\mid}}{\text{C}}-\text{C}-$ | H | 11 | 24 |
| 6OCH$_3$ | $-\overset{\overset{\text{C}}{\mid}}{\underset{\underset{\text{C}}{\mid}}{\text{C}}}-\text{C}-$ | H | 20 | 42 |
| H | $-\overset{\overset{\text{C}}{\mid}}{\underset{\underset{\text{C}}{\mid}}{\text{C}}}-\text{C}-$ | $-\text{C}_2\text{H}_5$ | ---------------- | 35 |
| H | $-\text{C}-\text{C}-\text{C}-$ | H | 7 | 32 |
| 6OCH$_3$ | $-\text{C}-\text{C}-\text{C}-$ | H | >32 | 41 |
| H | $-\text{C}-\text{C}-\text{C}-\text{C}-$ | H | 8 | 56 |
| H | $-\text{C}-\text{C}-$ | $-\text{C}_2\text{H}_5$ | ---------------- | 37 |
| 6OCH$_3$ | $-\text{C}-\text{C}-$ | H | ---------------- | 17 |

The pharmaceutical compositions of our invention are particularly useful in controlling anxiety, tension, agitation and confusion of psychosis and neurosis of mammals. In general, the dosage of the active substance depends intimately upon the nature of the disorder and the expert can adapt it to the individual need of the mammal being treated. Therefore, the daily doses may vary between fairly wide limits, for example between 5 and 1000 mg., which may be administered in one up to five portions, a dosage of between about 50-250 mg. usually producing satisfactory results. In general, a distinct reduction of fear, emotion, aggression and/or motoric disquiet will be assessed a fairly short time after the administration of these compositions.

The pharmaceutical compositions of our invention may be supplied in the conventional dosage units such as tablets, pills, dragees, suppositories, injection liquids and capsules. If desired, other pharmacologically active substances may be incorporated in said preparations. These different pharmaceutic forms of administrations may be produced by techniques commonly used in pharmacy incorporating a therapeutically active substance in inert, solid or liquid carrier materials.

Solid carriers are, for example, starch, talcum, lactose, gelatin, Na-carboxymethylcellulose, magnesium stearate and mixtures thereof and liquid carriers are water, rendered isotonically with blood by salt or water mixed with a polyalcohol, for example, glycerine.

Both the free amino bases and the acid-addition salts of these bases according to the invention with pharmaceutical acceptable acids may be used for the production of the pharmaceutical preparations.

As acid-addition salts, mention may be made by way of example, of salts formed with hydrochloric acid, hydrobromic acid, sulphuric acid, sulphaminic acid, tartaric acid, citcric acid and acetic acid.

Some examples of compounds of the invention in addition to those listed above are:

N-(6-methoxy-α-naphthyl)-3-methyl-3-aminopropionic acid
N-(6-methoxy-α-naphthyl)-3-methyl-3-aminopropionic acid ethylester
N-(6-chloro-α-naphthyl)-3-methyl-3-aminopropionic acid
N-(α-naphthyl)-2,2-dimethyl-3-amino propionic acid
N-(6-bromo-α-naphthyl)-3-methyl-3-aminopropionic acid
N-(6-methyl-α-naphthyl)-3-aminopropionic acid
N-(4-chloro-α-naphthyl)-3-aminopropionic acid
N-(6-fluoro-α-naphthyl)-3-aminopropionic acid
N-(7-ethoxy-α-naphthyl)-3-aminopropionic acid
N-(5-butoxy-α-naphthyl)-3-aminopropionic acid
N-(α-naphthyl)-3-aminopropionic acid propyl ester
N-(7-bromo-α-naphthyl)-3-aminopropionic ethyl ester
N-(2-chloro-α-naphthyl)-3-aminopropionic butyl ester
N-(6-methoxy-α-naphthyl)-3-aminopropionic acid methyl ester and
N-(6-methoxy-α-naphthyl)-3-aminopropionic acid butyl ester.

Further examples are the acid addition salts of these compounds with such pharmaceutically acceptable acids as hydrochloric acid, hydrobromic acid, sulfuric acid, citric acid and acetic acid.

Compounds according to the invention may be manufactured, for example, by causing a naphthyl amine of Formula II:

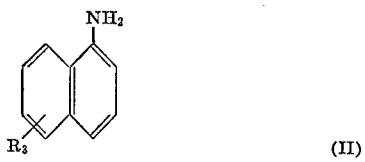

(II)

where $R_3$ has the same meaning as in Formula I, to react with a compound of Formula III:

(III)

where $R_1$ has the same meaning as in Formula I and $R_2'$ is an alkenyl group from which during the reaction the alkylene group $R_2$ of Formula I may be formed by adding a hydrogen atom.

The reaction may be carried out, for example by heating the reactants in a suitable solvent. Thus it is possible, for example to reflux in, for example, toluene, xylene, benzene, acetonitrile or acetic acid.

As examples of the group $R_2'$ may be mentioned:

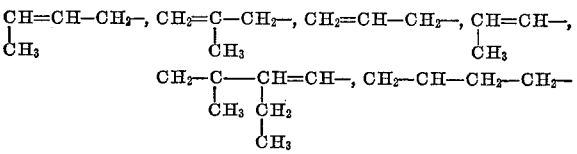

Another method of manufacturing compounds according to the invention is that in which a compound of Formula II is caused to react with an oxo compound of Formula IV, $$O=R_2''-COOR_1 \quad (IV)$$

followed by catalytic reduction of the intermediately formed Schiff base. $R_1$ in the Formula IV has the same meaning as in Formula I and $R_2''$ is an alkylene group from which during the reduction the alkylene group $R_2$ is formed by adding a hydrogen atom.

Examples of the group $R_2''$ are:

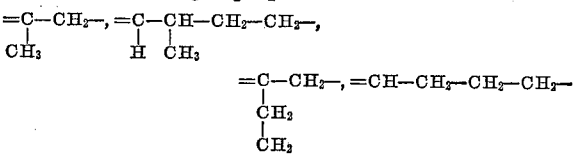

The reaction may be carried out in a suitable solvent, such as for example, a lower alcohol: ethanol, propanol, or the like. The medium is preferably made slightly basic with, for example, sodium acetate or sodium carbonate. The catalytic reduction may be carried out with, for example, Raney nickel, palladium/carbon, or platinum while introducing hydrogen under increased pressure if desired.

An alternative method of manufacturing compounds of Formula I is that in which a nitrile of Formula V:

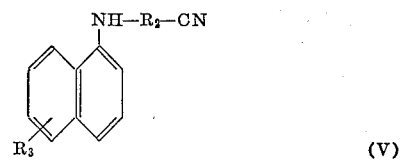

(V)

where $R_2$ and $R_3$ have the same significance as in Formula I is saponified and the resulting acid then esterified for the manufacture of those compounds in which $R_1$ represents an alkyl group.

The reaction may be carried out either in acid or in alakline medium in the presence of, for example, hydrochloric acid or sulphuric acid and sodium hydroxide or potassium hydroxide respectively. The solvent used, may be for example, alcohol possibly diluted with water.

Compounds of Formula V may be obtained in different ways, for example by causing a compound of Formula VI $$Br-R_2-Cl \quad (VI)$$

where $R_2$ has the same significance as in Formula I to react with a naphthyl amine of Formula II and converting the reaction product with KCN, and also by causing a compound of Formula II to react with a compound of Formula VII:

$$Hal-R_2-CN \quad (VII)$$

By such a reaction it is also possible to obtain compounds according to the invention, namely if an amine of Formula II is caused to react with a halo compound, for example, a chloro or bromo compound of Formula VIII:

$$Hal-R_2-COOR_1 \quad (VIII)$$

where $R_1$ and $R_2$ have the same meaning as in Formula I. This reaction is especially suitable for those compounds in which the carbon atom of the alkylene group, which is in the β position, relative to the amino group, carries an alkyl substituent. The reaction may be carried out, for example, in boiling acetonitrile, tetrahydrofurane or lower alcohols. An acid binder such as KOH, NaOH, $NaOC_2H_5$ or $NaNH_2$ is preferably added.

Compounds according to the invention may also be obtained by reacting an amine of Formula II to react with a lactone of Formula IX:

(IX)

where $R_2$ has the same meaning as in Formula I. This reaction, which especially yields satisfactory results with compounds in which $R_2$ represents a substituted ethylene group, may be carried out in solvents such as boiling ether, acetonitrile, or tetrahydrofurane. The acid produced may subsequently be converted into the corresponding esters, for example, by heating in the corresponding alcohols by the action of an acid, for example, HCl or $H_2SO_4$.

Also compounds according to the invention may be manufactured by causing a halogen compound of Formula X:

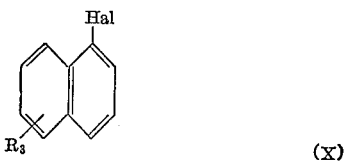

(X)

where $R_3$ has the same significance as in Formula I to react with a compound of Formula XI, $$H_2H—R_2—COOR_1 \quad (XI)$$

where $R_1$ and $R_2$ have the same meaning as in Formula I and Hal is a halogen atom, for example, a chlorine atom or a bromine atom. This reaction is preferably not used if $R_3$ is a halogen atom. The solvent used may be acetonitrile, dimethyl formamide, or an alcohol. The acid binder may be KOH, NaOH, $NaOC_2H_5$ or $NaNH_2$.

Our invention will now be described in greater detail with reference to the following examples:

EXAMPLE I

Production of the ethylester of N($\alpha$-naphthyl)-3-aminopropionic acid 36 g. of $\alpha$-naphthylamine, 175 g. of ethylacrylate and 50 mls. of glacial acetic acid was refluxed for 8 hours. After distilling off, at a reduced pressure, the excess quantity of ethylacrylate and after the addition of 400 ml. of a hydrochloric acid solution in ethanol, 54 g. of crude product could be isolated as a residue. Recrystallization from ethanol yielded 45 g. of the hydrochloric acid salt of the above-mentioned ester with a melting point of 137–139° C.

EXAMPLE II

Esterification of N($\alpha$-naphthyl)-3-aminoproprionic acid 10 g. of the above-mentioned acid was dissolved in 50 ml. of ethanol in 1 ml. of concentrated sulphuric acid. The mixture was then refluxed for one hour. After the termination of the reaction the excess quantity of alcohol was distilled off at a reduced pressure. The residue was dissolved in chloroform and then washed with water, saturated aqueous sodium bicarbonate solution and again with water. The organic liquid layer was evaporated and the residue was dissolved in 100 mls. of dry diethylester. After the addition of alcoholic hydrochloric acid, the hydrochloride acid salt of the ethylester of N($\alpha$-naphthyl)-3-aminopropionic acid crystallized out, which had a melting point of 137–139° C. after recrystallization from ethanol.

EXAMPLE III

In a manner quite similar to that described in Example I 6-methoxy-$\alpha$-naphthylamine and ethylacrylate yielded the ethylester of N($\beta$-methoxy-$\alpha$-naphthyl)-3-aminopropionic acid, the hydrochloric acid salt of which had a melting point of 124–126° C.

EXAMPLE IV

By reacting in the manner described in Example I, 6-methoxy-$\alpha$-naphthylamine with methylacrylate, the methylester of N(6-methoxy-$\alpha$-naphthyl) - 3 - aminopropionic acid was obtained; the hydrochloric acid salt thereof had a melting point of 149–151° C.

EXAMPLE V

Production of N-(6-methoxy-$\alpha$-naphthyl)-3-aminopropionic acid

To a solution of 175 g. of 6-methoxy-$\alpha$-naphthylamine in 500 ml. of dry acetonitrile was added one batch 72 g. of $\beta$-propiolactone. The reaction mixture obtained was then refluxed for 24 hours. Then the solvent was removed at a reduced pressure. The residue was dissolved in ether and extracted from a solution of 1 mol NaOH in 300 ml. of water. The resultant alcoholic solution was acidified with glacial acetic acid, after which the precipitated acid was filtered out. It was then washed with water and dried. After recrystallization from a mixture of acetone and benzene (1:25) the aforesaid acid as obtained with a melting point of 156–158° C.

EXAMPLE VI

In the manner corresponding to that of Example V the reaction between 2-methyl-$\alpha$-naphthylamine and $\beta$-propiolactone yielded the N(2-methyl-$\alpha$-naphthyl)-3-aminopropionic acid, the hydrochloric acid salt of which had a melting point of 200–201° after recrystallization from a mixture of ether and alcohol.

EXAMPLE VII

In a similar manner the reaction of 2-ethoxy-$\alpha$-naphthylamine with $\beta$-propiolactone yielded the N(2-ethoxy-$\alpha$-naphthyl)-3-aminopropionic acid, the hydrochloric acid salt of which had a melting point of 190–192° C. after crystallization from a mixture of acetone and alcohol.

EXAMPLE VIII

In the manner described in Example V, 4-chloro-$\alpha$-naphthylamine was reacted with $\beta$-propiolactone; the result was N(4-chloro-$\alpha$-naphthyl)-3-aminopropionic acid, which had a melting point of 162–163° C. after crystallization from 96% ethanol.

EXAMPLE IX

The reaction of 5-methoxy-$\alpha$-naphthylamine was $\beta$-propiolactone in the manner described above yielded N(5-methoxy-$\alpha$-naphthyl) - 3 - aminopropionic acid; melting point 159–160° C. after crystallization.

EXAMPLE X

N-($\alpha$-naphthyl)-3-methyl-3-aminopropionic acid HCl

A mixture consisting of 7.5 g. of $\alpha$-naphthyl amine, 6.25 g. of crotonic acid and 75 ml. of absolute toluene was boiled with reflux cooling for 20 hours. Thereafter 125 ml. of benzene were added, and, after cooling, the whole was extracted twice with 100 ml. of 1 N NaOH. The combined NaOH extracts were carefully acidified with glacial acetic acid and the resulting oil absorbed in ether. The water layer was again extracted twice with ether and the combined ether extracts dried on $Na_2SO_4$. The addition of 12.5 ml. of 4 N alcoholic HCl solution resulted in a crystalline deposit which was vacuum filtered, washed with ether and dried in air.

Yield: 4.3 g., melting point 186–188° C.

After recrystallization from acetone: melting point 187–188° C.

EXAMPLE XI

N-(6-methoxy-$\alpha$-naphthyl)-3-methyl-3-aminopropionic acid

Starting from 10 g. of 6-methoxy-$\alpha$-naphthyl amine, this compound was obtained by the method described in Example X.

Yield: 4.9 g. of HCl salt, melting point 203° C. to 105° C. After recrystallization from absolute alcohol: melting point 205–207° C.

EXAMPLE XII

N-($\alpha$-naphthyl)-3-ethyl-3-aminopropionic acid HCl

The desired compound was obtained by the method described in Example X, by starting from 12 g. of $\alpha$-naphthyl amine and 12 g. of $\beta$-ethylacrylic acid.

Yield: 3.87 g., melting point 170° C.–171° C.

After recrystallization from acetone-ether: melting point 174° C.–175° C.

EXAMPLE XIII

N-($\alpha$-naphthyl)-2-methyl-3-aminopropionic acid Cl 2.66 g. of HCl salt were obtained by the method described in Example X by using 7.5 g. of $\alpha$-naphthyl amine and 6.25 g. of methacrylic acid.

Melting point 181° C.–182° C.

After recrystallization from absolute alcohol-ester: melting point 182° C.–183° C.

EXAMPLE XIV

N-(α-naphtyl)-3-methyl-3-aminopropionic acid ethylester HCl 2.7 g. of N-(α-naphthyl)-3-methyl-3-aminopropionic acid HCl were dissolved in 27 ml. of alcohol. 0.25 ml. of concentrated $H_2SO_4$ was then added and the mixture was then boiled for five hours. The alcohol was then removed in vacuo. The resultant residue was washed with 100 ml. of 5% bicarbonate solution and then the wash liquid was extracted twice with 100 ml. of ether. The combined ether extracts were dried on $Na_2SO_4$ and then acidified with 5 ml. of 4 N alcoholic HCl-solution. After scratching, a white crystalline material was deposited. After being allowed to stand overnight the crystalline material was vacuum filtered and washed with ether.

Yield: 2.42 mg. of HCL salt, melting point 175° C.–180° C.

After recrystallization from alcohol-ether: melting point 188.5° C.–189.5° C.

EXAMPLE XV

N-(6-methoxy-α-naphthyl)-3-methyl-3-aminopropionic acid ethylester HCl 1.35 g. of HCl salt were obtained by the method described in Example XIV by using 2.2 g. of N-(6-methoxy-α-naphthyl)-3-methyl-3-amino propionic acid HCl.

Melting point 98° C–101° C.

EXAMPLE XVI

N-(α-naphthyl)-4-amino butyric acid 15 g. of succinic acid aldehyde methylester and 15 g. of α-naphthylamine were dissolved in 100 ml. of absolute alcohol. Then 1 g. of anhydrous sodium acetate and about 25 g. of Rae-Ni catalyst were added and the mixture hydrogenated at room temperature under 50 lbs. $H_2$-pressure for 5 hours. Subsequently, the catalyst was removed and the alcoholic solution evaporated to a small volume (approximately 25 ml.). A solution of 10 g. of KOH in 20 ml. of water was added and the whole boiled with reflux cooling for 2 hours. Thereafter the alcohol was removed in vacuo and water was added and the whole extracted three times with ether. The water layed was then carefully acidified with the acetic acid, the initially formed oil then becomes crystalline after a short period.

Yield: 17.4 g., melting point 100° C.

After recrystallization from acetone-water: Melting point 105° C.–107° C.

EXAMPLE XVII

N-(6-methoxy-α-naphthyl)-4-aminobutyric acid 2.8 g. of the above-identified compound were obtained by the method described in Example XVI by using 7 g. of succinic acid aldehyde methylester and 3.5 g. of 6-methoxy-α-naphthyl amine.

Melting point 138° C.–140° C.
After recrystallization from acetone-water mixture: melting point 141° C.–142° C.

EXAMPLE XVIII

N-(α-naphthyl)-5-aminovalerianic acid HCl

The above-mentioned compound was obtained by the method described in Example XVI by using 3.75 g. of glutaric acid-aldehyde methylester and 2.2 g. of α-naphthylamine. Since the substance did not become crystalline, the oil was absorbed in ether and crystallized as the HCl salt with an alcoholic hydrochloric acid solution.

Yield: 1.6 g., melting point 180.5° C.–183.5° C.
After recrystallization from an acetone-methanol mixture: melting point 183.5°–185° C.

EXAMPLE XIXa

N-(α-naphthyl)-4-aminobutyronitrile HCl 10 g. of N-(α-naphthyl)-3-amino-n-propylbromide and 4.5 g. of KCN were dissolved in 150 ml. of dimethylformamide and 25 ml. of water. The resulting reaction mixture was heated at 60° C. for 16 hours. Then the solvent was removed in vacuo and the residue absorbed in chloroform. The layer of chloroform was then washed one time with water and removed in vacuo. The residue was then absorbed in dry ether and carefully acidified with 4 N alcoholic hydrochloric acid. After slightly scratching the acid solution, a crystalline deposit resulted. This deposit was vacuum filtered, washed with ether and dried.

Yield: 7.86 g., melting point 115° C.–120° C.

EXAMPLE XIXb

N-(α-naphthyl)-4-aminobutyric acid HCl 7.87 g. of N-(α-naphthyl)-4-aminobutyronitrile HCl and 64 g. of 50% sulphuric acid solution were boiled under reflux for three hours. After cooling, the reaction mixture was poured into ice water and carefully made basic with 50% KOH-solution while cooling. The aqueous solution was then extracted one time with ether to avoid contamination and the basic layer carefully acidified with acetone acid. The resultant acid layer was extracted with ether. This ether layer was dried on $Na_2SO_4$ and acidified with 4 N alcoholic HCl solution. After scratching, a crystalline deposit resulted which was vacuum filtered, washed with ether and dried on $CaCl_2$ and NaOH.

Melting point 136° C.–140° C. with dissociation.

EXAMPLE XX

N-(6-chloro-α-naphthyl)-3-methyl-3-aminopropionic acid HCl

A mixture consisting of 1.82 g. of 6-chloro-α-naphthyl amine, 1.5 g. of crotonic acid and 20 ml. of absolute toluene was boiled under reflux for 20 hours. Thereafter 50 ml. of benzene were added and the whole extracted twice with 20 ml. of 2 N NaOH. The combined NaOH extracts were carefully acidified with acetic acid and the resulting semi-solid substance absorbed in ether. The ether layer was dried on $Na_2SO_4$, followed by introducing dry HCl gas. After scratching slightly, a crystalline deposit resulted, which was vacuum filtered and washed with ether. After recrystallization from a vacuum filtered acetone-ether mixture, the melting point was 156° C. to 160° C.

EXAMPLE XXI

N-(α-naphthyl)-2,2-dimethyl-3-aminopropionic acid

A mixture consisting of 6.83 g. of α-chloropivaline acid, 14.3 g. of α-naphthyl amine and 50 ml. of dimethylformamide were heated at 150° C. for 24 hours. Then the solvent was removed in vacuo and 50 ml. of 2 NaOH were added to the residue. The alkali layer of water was extracted with ether to avoid contamination and then acidified with acetic acid. The resulting oil was absorbed in ether, followed by drying on $Na_2SO_4$ and introducing dry HCl gas. After adding a small amount of acetone the HCl salt crystallized. This salt was vacuum filtered and washed with ether. The free acid was prepared by suspending the HCl salt in water, adding diluted NaOH until the solution became basic and then acetic acid until the solution became acid, thus causing the free acid to deposit in the crystalline state.

The substance was vacuum filtered, washed with water and dried on $P_2O_5$.
Melting point 121° C.–122.5° C.

EXAMPLE XXII

N-(α-naphthyl)-3-methyl-3-aminopropionic acid HCl

A mixture consisting of 7.5 g. of α-naphthyl amine, 6.25 g. of β-butyrolactone and 100 ml. of acetonitrile was boiled under reflux for 24 hours. Then the solvent was removed in vacuo and the residue treated with 50 ml. of 2 N NaOH. The basic layer was extracted with ether to avoid contamination and then acidified with 7.5 ml. of acetic acid. The deposited oil was absorbed in ether, followed by drying on $Na_2SO_4$. After the introduction of dry HCl gas, the resulting crystalline HCl-salt was vacuum filtered and washed with ether.

Yield: 1 g., melting point 184° C.–185° C.

The melting point of a mixture with the substance obtained via coupling with crotonic acid was not depressed. The IR-spectra of the two compounds were also identical.

EXAMPLE XXIII

Production of a tablet

200 g. of the hydrochloric acid salt of N(6-methoxy-α-naphthyl)-3-aminopropionic acid, 355 g. of lactose and 30 g. of potato starch were mixed to a homogeneous mixture. The mixture was granulated and dried at 45° C., after which the mass was again granulated. The grains were then mixed with 25 g. of talcum, 5 g. of Mg-stearate, and 30 g. of potato starch. The resultant mixture was compressed to tablets of a weight of 650 mg.

EXAMPLE XXIV

Production of an injection liquid

In a mixing kettle 70 litres of distilled water and 2.5 kg. of glycerine were mixed and a solution of 0.5 kg. of the hydrochloric acid salt of the ethyl ester of N(α-naphthyl)-3-aminopropionic acid in 10 litres of water was added while stirring, after which the contents of the mixing kettle were completed with distilled water to 100 litres. The injection liquid obtained after thorough stirring was worked up in a conventional manner in ampules each containing 2 ml. of the injection liquid.

What we claim is:

1. A therapeutic composition having tranquilizer properties said composition comprising in unit dosage form from about 5 to about 1000 mg. of a compound selected from the group consisting of a base of the formula:

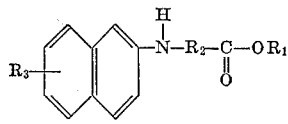

wherein $R_1$ is a member selected from the group consisting of hydrogen, alkyl of 1 to 4 carbon atoms inclusive and alkali metal atoms, $R_2$ is an alkylene group of 2 to 7 carbon atoms inclusive and $R_3$ is a member selected from the group consisting of hydrogen, halogen, alkoxy of 1 to 4 carbon atoms inclusive and alkyl of 1 to 4 carbon atoms inclusive, and the acid addition salts thereof with pharmaceutically acceptable acids together with a major amount of a pharmaceutical carrier therefor.

2. The therapeutic composition of claim 1 wherein $R_3$ is alkoxy.

3. The therapeutic composition of claim 2 wherein the base is N-(6-methoxy-α-naphthyl)-3-aminopropionic acid.

4. The therapeutic composition of claim 1 wherein the base is N-(α-naphthyl-3-methyl-3-aminopropionic acid.

5. The therapeutic composition of claim 1 wherein the base is N-(α-naphthyl)-3-methyl-3-aminopropionic acid ethyl ester.

6. The therapeutic composition of claim 1 wherein the base is a member selected from the group consisting of N-(α-naphthyl)-2-methyl-3-aminopropionic acid and the alkali metal salts thereof.

7. The therapeutic composition of claim 1 wherein the base is a member selected from the group consisting of N-(α-naphthyl)-4-aminobutyric acid and the alkali salts thereof.

8. The therapeutic composition of claim 1 wherein the base is N-(6-methoxy-α-naphthyl)-4-aminobutyric acid.

9. The therapeutic composition of claim 1 wherein the base is N-(2-naphthyl)-5-aminoalerianic acid.

10. The therapeutic composition of claim 1 wherein the base is N-(α-naphthyl)-3-ethyl-3-aminopropionic acid.

11. The therapeutic composition of claim 1 wherein the base is N-(6-methoxy-α-naphthyl)-3-methyl-3-aminopropionic acid.

12. The therapeutic composition of claim 1 wherein the base is N-(6-chloro-α-naphthyl)-3-methyl-3-aminopropionic acid.

13. The therapeutic composition of claim 1 wherein the base is N-(α-naphthyl)-2,2-dimethyl-3-aminopropionic acid.

14. The therapeutic composition of claim 1 wherein the base is N-(6-methoxy-α-naphthyl)-3-methyl-3-aminopropionic acid ester.

15. A method of producing a tranquilizer effect in a mammal comprising administering to said mammal an effective amount of the composition of claim 1.

16. A method of producing a tranquilizer effect in a mammal comprising orally administering to said mammal an effective amount of the composition of claim 1.

References Cited

FOREIGN PATENTS 433,848  9/1926  Germany.

ALBERT T. MEYERS, Primary Examiner

S. J. FRIEDMAN, Assistant Examiner

U.S. Cl. X.R.

424—319; 260—471, 518, 519